H. A. REYNOLDS,
Assignor to H. M. RICHARDSON AND G. McKEE.
Velocipede.
No. 8,252. Reissued May 28, 1878.
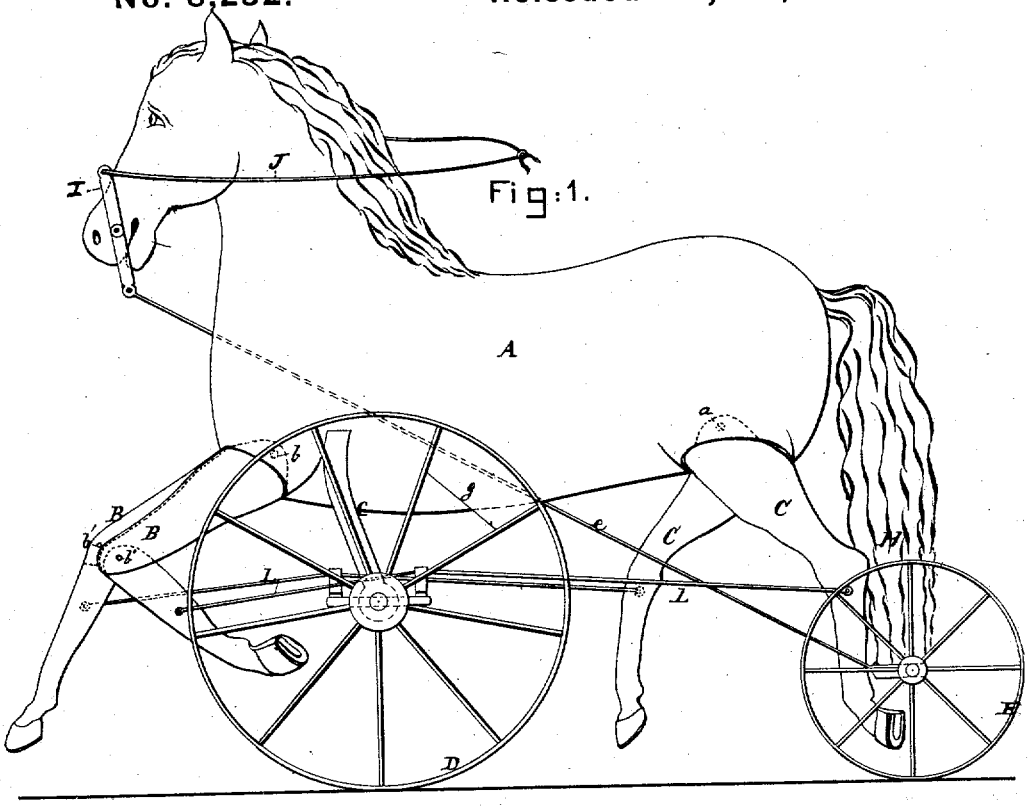
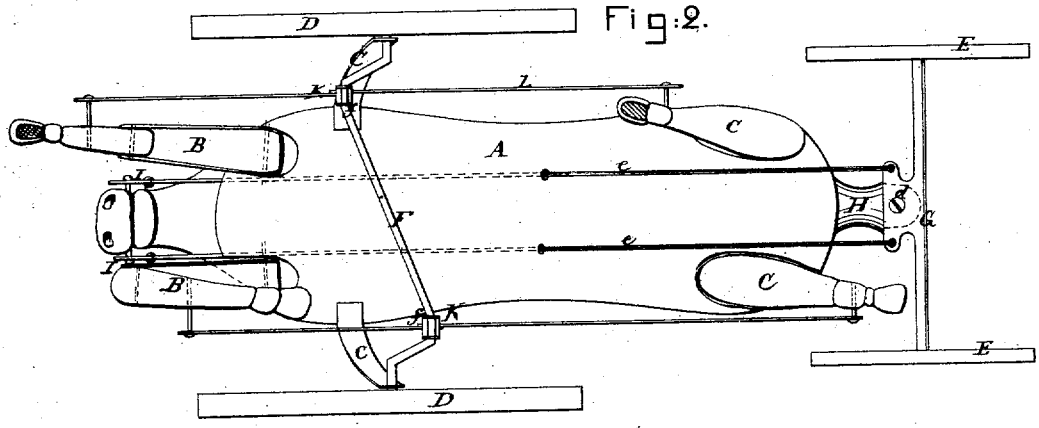
Witnesses.
A. E. C. Whitney
Fred. Wills
Fig: 3.
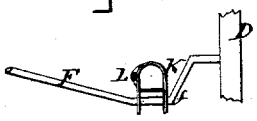
Inventor.
Harvey A Reynolds
by Crosby & Gregory Attys
THE NORRIS PETERS CO., PHOTO-LITHO., WASHINGTON, D. C.

UNITED STATES PATENT OFFICE.

HARVEY A. REYNOLDS, OF NEW YORK, N. Y., ASSIGNOR TO HENRY M. RICHARDSON AND GEORGE McKEE.

IMPROVEMENT IN VELOCIPEDES.

Specification forming part of Letters Patent No. 46,705, dated March 7, 1865; Reissue No. 8,252, dated May 28, 1878; application filed April 15, 1878.

*To all whom it may concern:*

Be it known that I, HARVEY A. REYNOLDS, of the city, county, and State of New York, have invented a new and Improved Velocipede and Trotting or Pacing Horse; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, an under view or an inverted plan of the same; Fig. 3, a detached view of a portion of an axle pertaining to the same.

Similar letters of reference indicate like parts.

This invention relates to a new and improved velocipede trotting or pacing horse for children. The horse is shown as mounted upon axles provided with wheels. The axle carrying the driving-wheels is provided with cranks, having stirrups applied to them and arranged in such a manner that the driving-wheels may be turned by a direct application of the feet of the rider to them.

The legs of the horse are jointed, and connected with the cranks of the driving-axle in such a manner that they will have a trotting or pacing movement imparted to them as the horse is propelled along over the ground.

A represents the body of the horse; B, the fore legs, jointed at *b b'*; and C, the hind legs, jointed to the body at *a*.

The rigid body A has fixed at its front bearing-pieces *c c*, which receive and sustain the driving-axle F, having driving-wheels D D fixed thereon, and the lower end of the rigid portion H of the body, shaped to resemble the tail of a horse, receives within it a king-bolt, *d*, to unite the body and rear axle C, provided with the hind wheels E E.

The axle G is connected, by two wires, *e e*, with levers I I, which are pivoted one at each side of the head, such levers being moved by a guide-rein, J, attached to their upper ends, so that the rear axle may be turned as desired to steer or guide the horse or velocipede.

The axle F of the front or driving wheels is formed with two cranks, *f f*, in reverse or opposite positions, each crank having a stirrup, K, attached to it to receive the foot of the rider, so that the driving-wheels may be turned by a direct application to them of the foot of the rider. These stirrups are connected by rods L at their fronts with the lower parts of the front legs B, and at their backs with the lower parts of the hind legs C.

The wheels D are each provided with a weight, *g*, to assist in throwing the cranks *f* past or over their dead-centers. By this arrangement the horse or velocipede may be propelled along by the rider with the greatest facility and with but a moderate exertion or application of power, as the feet of the rider are applied directly to the axle, all treadle-levers, &c., hitherto used for similar or analogous purposes, being dispensed with.

It will be noticed that the horse-figure, which serves as the seat for the rider, rigidly connects the two axles together, so that the rider's seat is always held up by the two axles, and that the rider's weight is thrown between the axles.

One of the axles connected by this rigid connecting-body A (shown as the hind axle) is arranged to be turned out of parallelism with reference to the other, to direct the course of the velocipede.

I am aware that the forward-driven axle of a velocipede has been provided with cranks projected in the same direction, and that such axle has been rotated by a rider, who has applied his weight alternately to the cranks and to the horse-body or seat, also on a crank; but I am not aware, prior to this, my invention, that a velocipede was ever made in which a rider in his seat could, by the motion of his legs, with his feet resting directly on oppositely-projecting cranks or stirrups thereon, rotate the driving-shaft positively and propel the velocipede.

I claim—

1. In a velocipede, a forward-driven axle provided with reversed or oppositely-projecting cranks, combined with a seat for the rider, whereby the oppositely-projecting cranks may be acted upon by the feet of the rider to rotate the axle and propel the velocipede, substantially as described.

2. A rigid seat adapted to connect the front and rear axles, and remain in a fixed position as to its elevation above the axle during the movement of the velocipede, combined with a forward-driven axle, provided with reversed cranks and stirrups, to be operated directly by the feet of the rider.

3. A rigid seat adapted to connect the front and rear axles, and remain in a fixed position as to its elevation above the axle during the movement of the velocipede, combined with a forward-driven axle, provided with reversed cranks and stirrups, to be operated directly by the feet of the rider, and with mechanism to move one axle out of parallelism with the other, to direct the course of the velocipede.

4. A velocipede trotting or pacing horse mounted upon axles provided with wheels, and having the axle of the forward or driving wheels provided with reversed cranks, substantially as explained.

5. The jointed legs and the stirrups K on the axle of the driving-wheels, combined with rods to connect them, substantially as and for the purpose specified.

HARVEY A. REYNOLDS.

Witnesses:
G. W. REYNOLDS,
JOHN H. FERGUSON.